US005745646A

United States Patent [19]
Saito

[11] Patent Number: 5,745,646
[45] Date of Patent: Apr. 28, 1998

[54] IMAGE PICK-UP APPARATUS FOR RECORDING WHEN RECORDING MEDIUM IS MOVED AT A STABLE SPEED

[75] Inventor: Syuichiro Saito, Yokohama, Japan

[73] Assignee: Canon Kabushiki Kaisha, Tokyo, Japan

[21] Appl. No.: 336,758

[22] Filed: Nov. 8, 1994

Related U.S. Application Data

[63] Continuation of Ser. No. 965,687, Oct. 26, 1992, abandoned, which is a continuation of Ser. No. 731,383, Jul. 16, 1991, abandoned, which is a continuation of Ser. No. 630,734, Dec. 20, 1990, abandoned, which is a continuation of Ser. No. 438,944, Nov. 17, 1989, abandoned, which is a continuation of Ser. No. 201,292, May 27, 1988, abandoned, which is a continuation of Ser. No. 634,057, Jul. 25, 1984, abandoned.

[30] Foreign Application Priority Data

Aug. 2, 1983 [JP] Japan ............... 58-142154
Aug. 2, 1983 [JP] Japan ............... 58-142158

[51] Int. Cl.$^6$ ................................ H04N 5/225
[52] U.S. Cl. ............... 386/117; 358/906; 358/909.1
[58] Field of Search ................... 358/906, 335, 358/342, 909, 213, 213.11, 213.13, 909.1; 360/33.1, 35.1, 70, 73, 71, 60; 386/38, 117

[56] References Cited

U.S. PATENT DOCUMENTS

| | | | |
|---|---|---|---|
| 4,471,388 | 9/1984 | Dischert | 358/906 X |
| 4,556,912 | 12/1985 | Yamanaka et al. | 358/906 X |
| 4,570,188 | 2/1986 | Ichiyanagi | 360/35.1 |
| 4,599,657 | 7/1986 | Kinoshita et al. | 358/906 X |

FOREIGN PATENT DOCUMENTS

| | | | |
|---|---|---|---|
| 58-33370 | 2/1983 | Japan | 358/909 |
| 58-85675 | 5/1983 | Japan | 358/909 |
| 58-103276 | 6/1983 | Japan . | |
| 58-104583 | 6/1983 | Japan | 358/906 |
| 58-96475 | 6/1983 | Japan | 358/906 |
| 58-98809 | 6/1983 | Japan | 358/906 |
| 59-051672 | 3/1984 | Japan . | |

*Primary Examiner*—Andrew L. Sniezek
*Attorney, Agent, or Firm*—Fitzpatrick, Cella, Harper & Scinto

[57] ABSTRACT

An image pickup apparatus for use in, for example, a camera, includes an image pickup device, an image pickup operation start switch, a recorder, a detector, an image pickup driver, and a controller. The image pickup device can be a CCD for converting an optical image to an electric signal. The image pickup operation start switch starts an image pickup operation in response to a manual operation. The recorder performs a predetermined signal processing of an electric signal provided by the image pickup device and records the processed electric signal on a recording medium driven with a predetermined speed. The detector detects whether a stable speed state of the recording medium is attained. The image pickup driver drives the image pickup device on the basis of a first reference signal for regular image pickup or a second reference signal corresponding to an operation state of the recorder. The controller causes the image pickup device to be driven by using the first reference signal in response to the operation by the image pickup operation start switch. The controller also causes the image pickup device to be driven by using the second reference signal after it is detected on the basis of an output of the detector that a predetermined stable speed state of the recording medium is attained, when the recorder is operated.

4 Claims, 7 Drawing Sheets

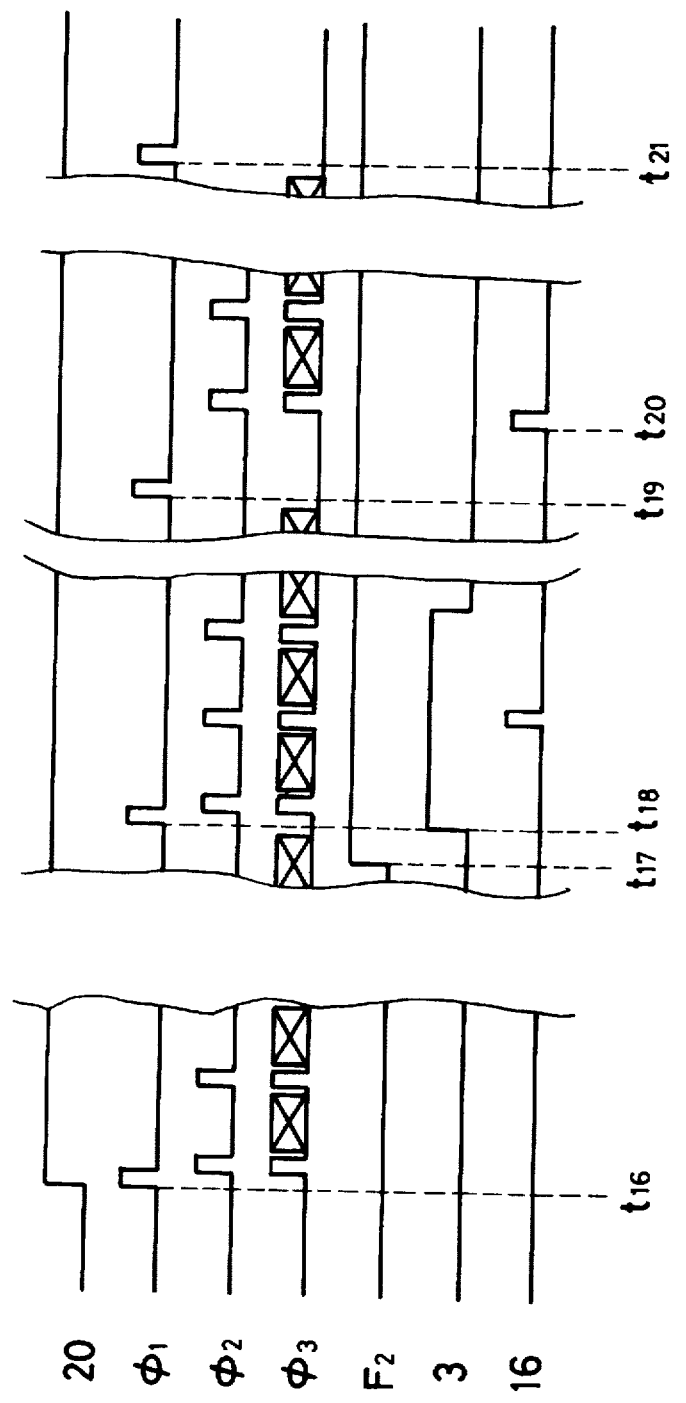

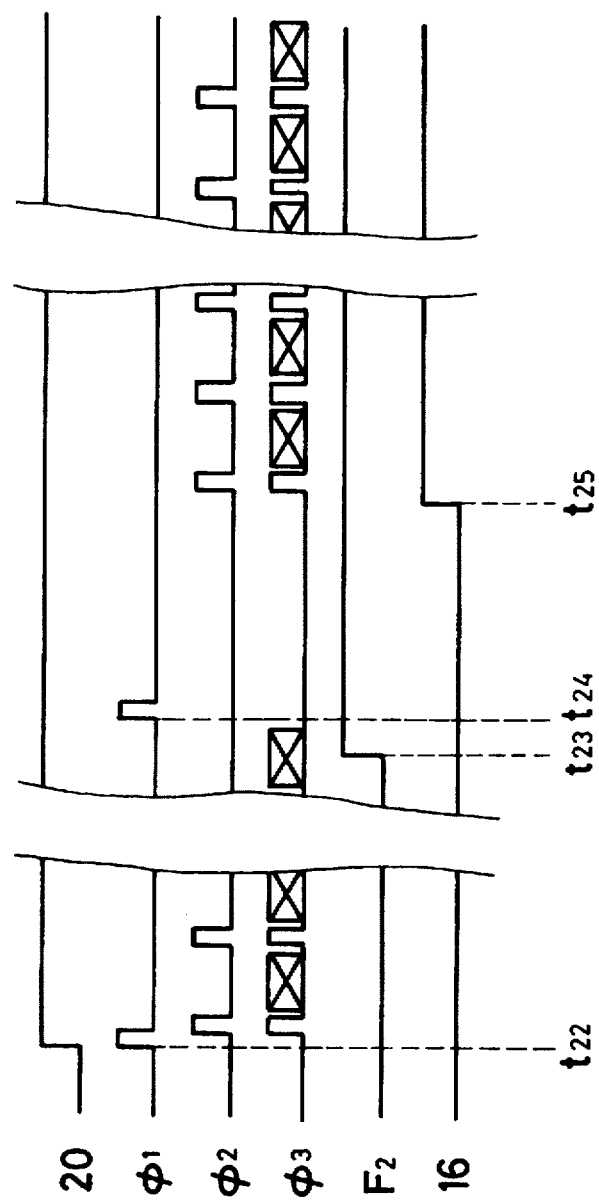

IMAGE PICK-UP APPARATUS FOR RECORDING WHEN RECORDING MEDIUM IS MOVED AT A STABLE SPEED

This application is a continuation of application Ser. No. 07/965,687, filed Oct. 26, 1992, now abandoned, which is a continuation application of Ser. No. 07/731,383, filed Jul. 16, 1991, now abandoned, which is a continuation application of Ser. No. 07/630,734, filed Dec. 20, 1990, now abandoned, which is a continuation application of Ser. No. 07/438,944, filed Nov. 17, 1989, now abandoned, which is a continuation of application Ser. No. 07/201,292, filed May 27, 1988, now abandoned, which is a continuation of application Ser. No. 07/634,057, filed on Jul. 25, 1984, now abandoned.

BACKGROUND OF THE INVENTION

1. Field of the Invention

The present invention relates to an image pickup and recording apparatus comprising an image pickup device for converting an optical image to an electrical signal and a shutter and a recording member which are periodically driven. However, it is not a factor consideration whether the image pickup device and recording member are enclosed in another casing which is detachable or not.

2. Description of the Prior Art

Conventionally, in this kind of apparatus, portability is usually demanded. Accordingly, electric power consumption must be suppressed to be as small as possible due to the limited battery capacity. Therefore, it is desirable that a power switch is operated immediately before or almost simultaneously when a switch for image pickup or recording is turned on. However, in general, many mechanical movable parts exist in the image pickup apparatus and it is extremely impossible to make those movable parts instantly operative.

As one of such parts, there is a recording apparatus to record an output of the image pickup device. For example, when a recording member such as a rotary magnetic sheet is considered as that recording apparatus, the sheet is driven so as to be rotated at the standard television period and is subjected to the rotational speed control so as to achieve a predetermined rotating speed. It is also subjected to the rotational phase control. In this case, the time required for the rotational speed control is ordinarily very much shorter than the time necessary for the rotational phase control. Therefore, if the time necessary for the rotational phase control can be shortened, the problem with respect to the leading operation will be solved.

In addition, as another example of such parts, there is a shutter for shutting off the light incident on the image pickup device.

In the case of considering, for instance, a rotary shutter as that shutter, the shutter is also energized and driven at the standard television period and is subjected to the rotational speed control so as to achieve a predetermined rotating speed. It is also subjected to the rotational phase control.

On the other hand, in this case, the time required to effect the rotational speed control is generally very much shorter than the time necessary to effect the rotational phase control similar to that of the recording medium.

Therefore, a similar problem as that with regard to the recording medium is caused.

SUMMARY OF THE INVENTION

It is an object of the present invention to provide an image pickup and recording apparatus which can solve such drawbacks associated with the conventional technology.

Another object of the invention is to provide an image pickup and recording apparatus which can substantially improve the leading characteristics in the recording apparatus.

Also, a further object of the invention is to provide an image pickup and recording apparatus which can substantially improve the leading characteristics in the shutter.

In one aspect of the present invention, an image pick-up apparatus is provided and includes an image pickup device for providing an electrical signal by picking up image light from an object; an image pickup operation start switch for starting an image pickup operation in response to a manual operation; a recording device for performing a predetermined signal processing of the electrical signal provided by the image pickup device and for recording the processed electrical signal on a recording medium driven with a predetermined speed; a detection device for detecting whether a stable speed state of the recording medium is attained; an image pickup driving device for driving the image pickup on the basis of a first reference signal for regular image pickup or a second reference signal corresponding to an operation state of the recording device; and a control device. The control device causes the image pickup device to be driven by using the first reference signal in response to the operation of the image pickup operation start switch, and causes the image pickup device to be driven by using the second reference signal after it is detected on the basis of an output of the detection device that a predetermined stable speed state of the recording medium is attained, when said recording medium is operated.

BRIEF DESCRIPTION OF THE DRAWINGS

FIG. 6 is a timing chart for a fourth embodiment; and

FIG. 7 is a timing chart for a fifth embodiment.

DETAILED DESCRIPTION OF THE PREFERRED EMBODIMENTS

The present invention will now be described in detail hereinbelow with respect to several preferred embodiments thereof. In place of performing the phase control of the mechanical movable part, this embodiment intends to completely eliminate substantial phase error by allowing the phase of the image pickup device to be synchronized with the phase of the mechanical movable part.

Figure 1:
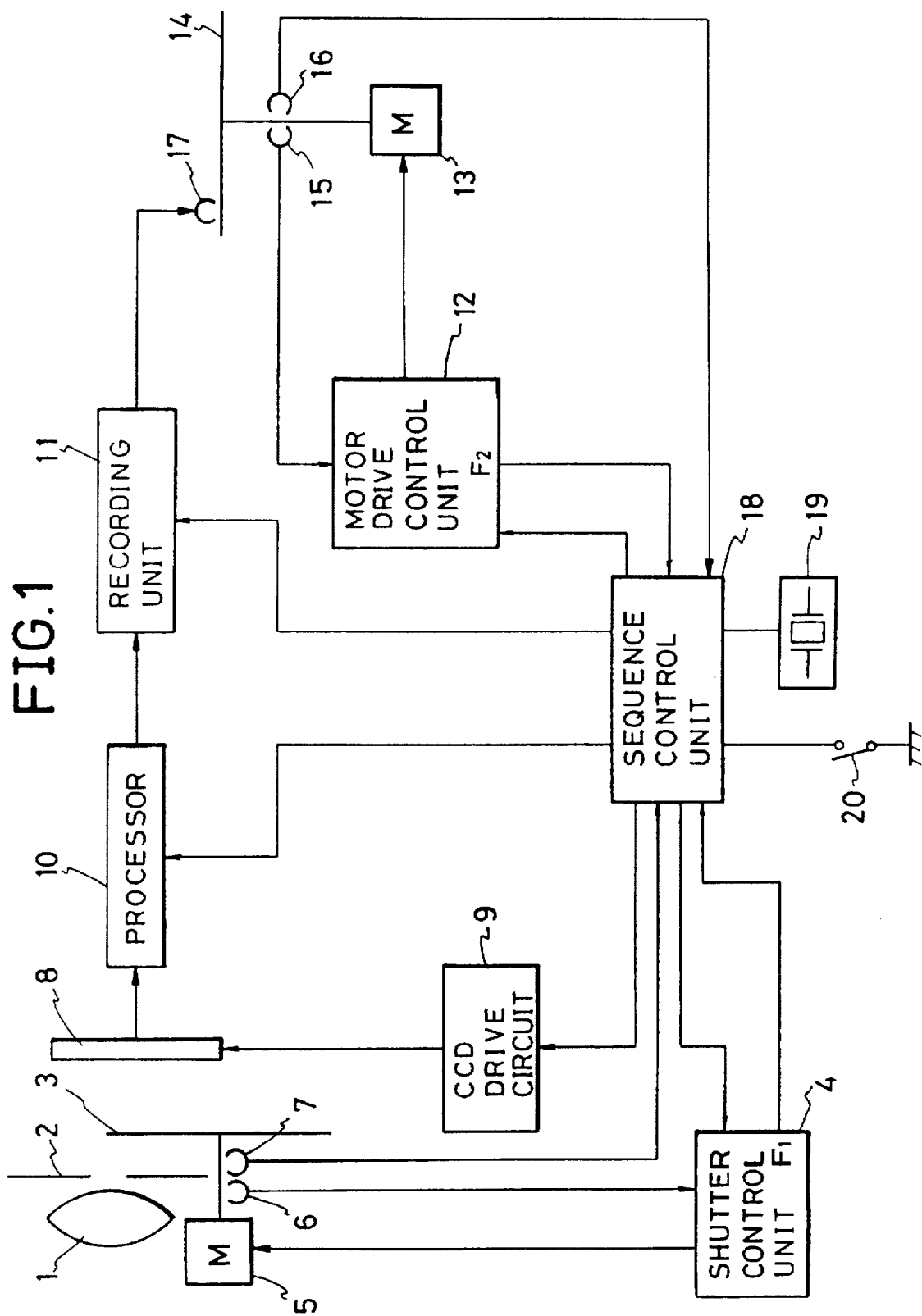
FIG. 1 is a block diagram showing an image pickup apparatus according to a first embodiment of the present invention.
Figure 2:
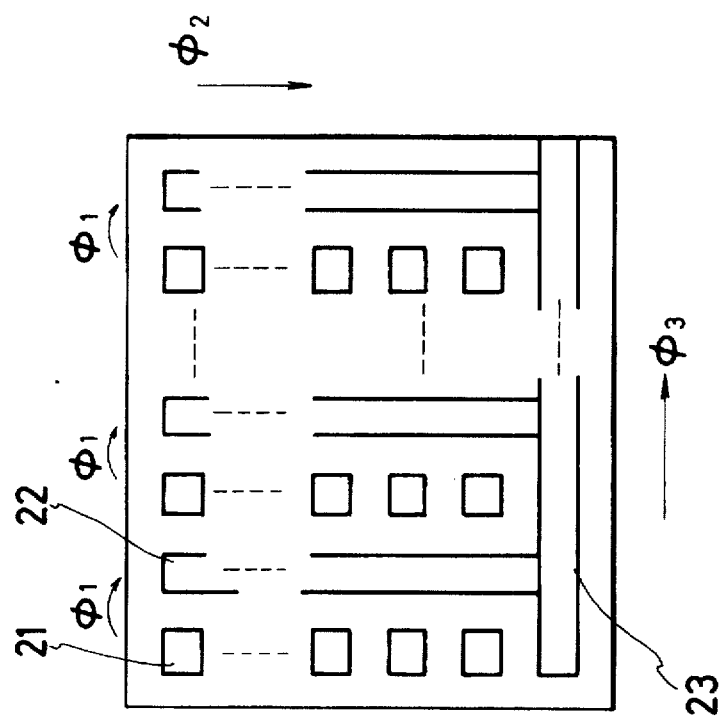
FIG. 2 is a diagrammatical view showing an image pickup device for use in the image pickup apparatus of FIG. 1.

FIG. 1 is a block diagram showing one embodiment of the present invention. In the diagram, a reference numeral 1 denotes a photographing optical system; 2 is a diaphragm; and 3 is a shutter blade used as shutter means. In this embodiment, a rotary shutter, which is used in an 8-mm silver halide film movie camera, is employed. A numeral 4 is a shutter control unit used as a first detecting means; 5 is a motor used as shutter driving means which is driven by the control unit 4; 6 is an FG head to detect the rotating speed of the motor 5; and 7 is a PG head to detect the rotational phase of the motor 5. In addition, PG head 7 outputs a pulse at the phase at which a shutter light-shields an image pickup device which will be mentioned later. A speed control lock signal for the shutter is output from a terminal $F_1$. When the speed is servo-locked, a signal at a high level is output. A numeral 8 is an image pickup device as image pickup means for converting an optical image to an electric signal. As an example of this image pickup device, an inter line type CCD is shown in FIG. 2. The reference numeral 21 indicates a photoelectric converting element; 22 is a vertical shift register; and 23 is a horizontal shift register. $\phi 1$ represents a shift pulse for allowing the charges of each photoelectric converting element to be transferred to the vertical shift register; $\phi 2$ is a vertical shift pulse; and $\phi 3$ is a horizontal shift pulse. Both vertical and horizontal shift registers are shielded against light.

In addition, as the image pickup device which can be applied to the present invention, it is not limited to the device of this example but incorporates all devices which can convert an optical image to an electric signal.

Returning to FIG. 1, a CCD drive circuit 9 used as image pickup control means controls the storage and transfer and the like of the charges in the CCD 8.

A numeral 10 denotes a signal processor and 11 is a recording signal processor (or recording unit). The timings for both processors are controlled by a sequence control unit 18. The numeral 14 is, e.g., a discoidal recording medium as the recording member; 17 is a head to record the signal obtained through the recording unit 11 on the recording medium 14; 13 is a motor used as recording member driving means for rotationally driving the medium 14; 12 is a drive control unit used as first detecting means for driving and controlling the motor 13.

An FG head 15 detects the rotating speed of the motor 13, and a PG head 16 detects the rotational phase of the motor 13. The PG head is arranged so as to output a pulse at the phase corresponding to the vertical sync signal of the medium 14.

The motor drive control circuit 12 controls the driving of the motor 13 in response to an output of the sequence control unit 18 and when the servo lock for control of the rotating speed is made operative, a terminal $F_2$ goes to a high level. A numeral 19 represents a reference clock generator and 20 indicates a trigger switch to start the recording and is also used as a power switch.

Figure 3:
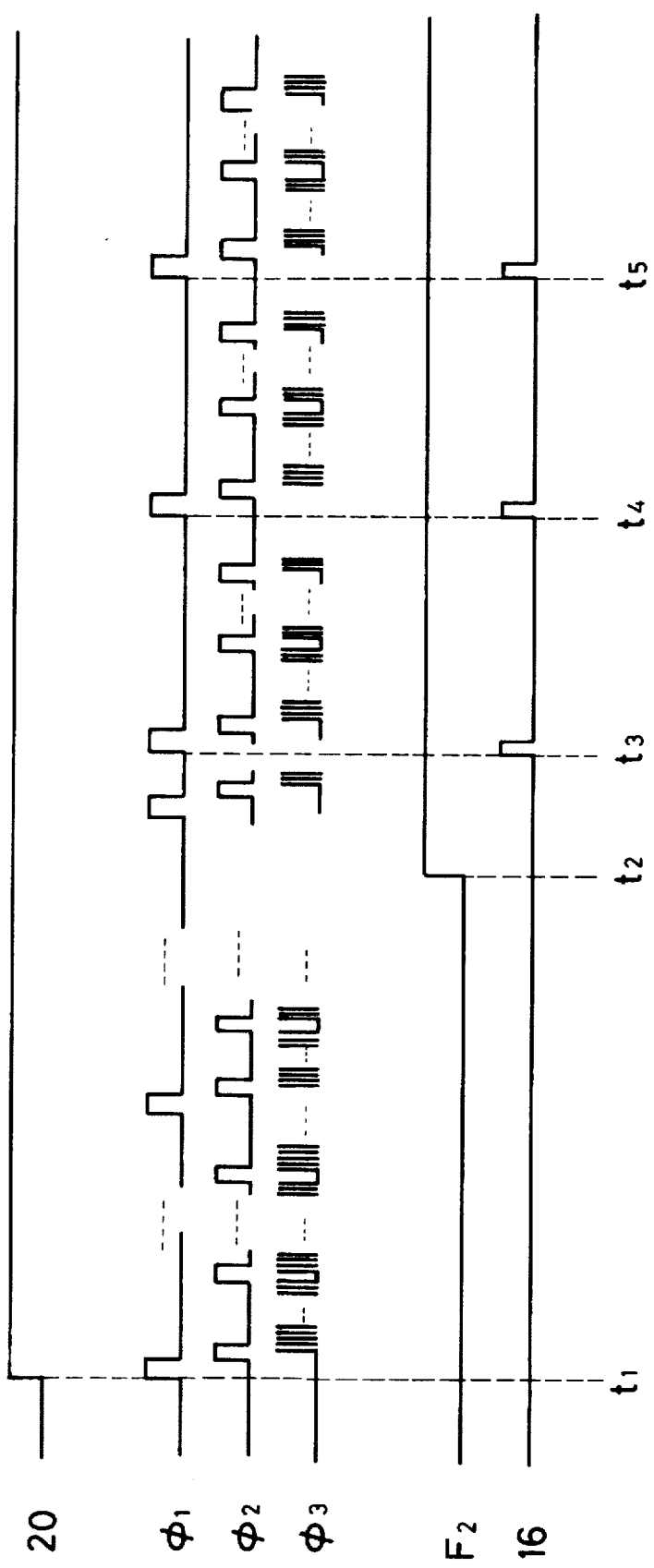
FIG. 3 is a timing chart showing an example of timing in FIG. 1.

FIG. 3 is a timing chart showing one example of the timing for the operation of the image pickup apparatus of FIG. 1. The invention will then be explained in detail hereinbelow with reference to FIG. 3.

First, when the switch 20 is closed at time $t_1$, power is supplied to each part. The CCD 8 is driven in response to the pulses $\phi 1$ to $\phi 3$ from the drive circuit synchronously with the reference pulse, so that the charges are stored, transferred and read out in accordance with the field period of 1/60 second. However, since the medium 14 and rotary shutter 3 have not reached predetermined rotating speeds, no recording is performed. When the medium 14 is locked to a predetermined rotating speed at time $t_2$, a high-level signal is output from the $F_2$ terminal, thereafter the drive circuit 9 is reset by the sequence control unit 18 synchronously with an output of the PG head 16. (times $t_3$, $t_4$, $t_5$, . . . ) Consequently, in place of matching the phase of the recording medium, the phase of the image pickup device is matched, so that the time necessary for the phase control is shortened to substantially zero. The signal read out after the time $t_3$ is recorded on the medium 14 through the signal processors 10 and 11 and head 17.

In addition, although an example of the rotary medium for the fixed head has been mentioned as the recording member in the foregoing embodiment, it may be a rotary head for fixed medium. Also, the recording member is not limited to the member which is rotationally driven, but the invention can be obviously applied to all recording members which are periodically driven.

On the other hand, although the image pickup apparatus includes the recording member, detecting means and the like in this embodiment, the image pickup apparatus mentioned here incorporates all of the parts of which the image pickup device, recording member, detecting means, etc. are connected in correspondence to one another, and it is not a factor whether each of them is enclosed in the individual casing or not.

As described above, according to the present invention, since there is no need to control the phase of the recording member having a slow leading time, the time which is necessary from the power-on to the photographing operation can be shortened, so that the operator will not miss the shutter chance. Further, since it is unnecessary to perform the phase control in the relative driving of the magnetic disk medium and head, there is an advantage of decreased jitter of the low-frequency component. In addition, it is possible to align the write location into the medium to synchronize the driving of the image pickup device with the rotational phase of the recording member, so that skew at the time of tracking can be reduced.

Figure 4:
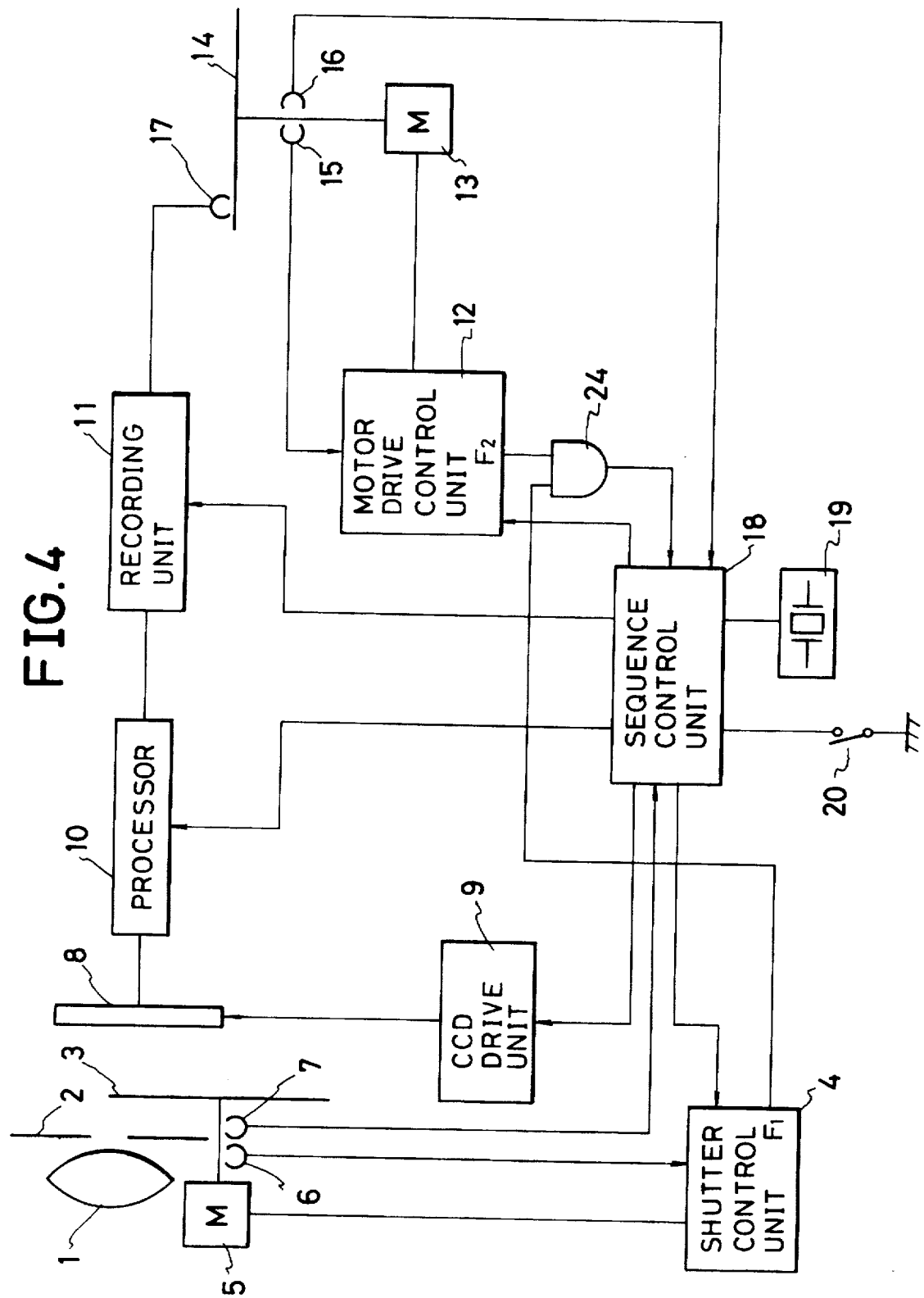
FIG. 4 is a block diagram of an image pickup apparatus according to a second embodiment of the present invention.

Referring now to FIG. 4, a second embodiment of the present invention is shown in which the same parts and components as those shown in FIGS. 1 to 3 are designated by the same reference numerals.

A reference numeral 24 denotes an AND gate to give AND of the outputs from the terminals $F_1$ and $F_2$ to the sequence control unit 18.

Figure 5:
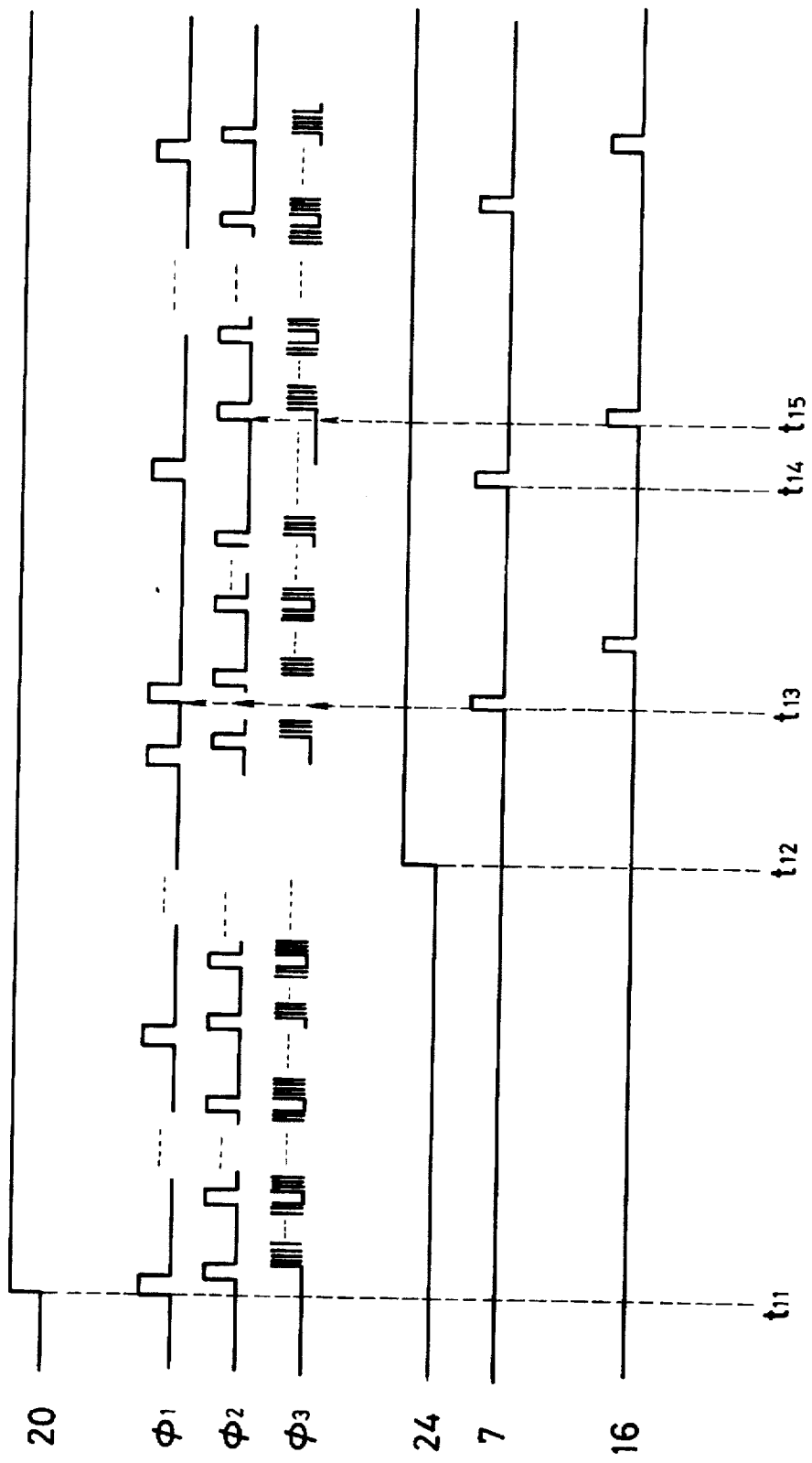
FIG. 5 is a timing chart showing a third embodiment showing the timing in FIG. 4.

FIG. 5 is a timing chart showing one example of the timing for the operation of the image pickup apparatus of FIG. 4.

The invention will then be explained in detail hereinbelow with reference to FIG. 5.

When the switch 20 is first closed at time $t_{11}$, power is supplied to each part. The CCD 8 is driven in response to the pulses $\phi 1$ to $\phi 3$ from the drive circuit synchronously with the reference pulse, so that the charges are stored, transferred and read out in accordance with the field period of 1/60 second. However, since the medium 14 and rotary shutter 3 have not reached predetermined rotating speeds, no recording is performed. When the rotary shutter 3 and medium 14 are locked to the predetermined rotating speeds at time $t_{12}$ (namely, when high-level signals are output from both $F_1$ and $F_2$ terminals), the recording is performed in accordance with the following sequence through the sequence control unit 18.

First, in this embodiment of the invention, the drive timing for the CCD 8 is synchronized with the rotational phase of the rotary shutter. Namely, the PG head 7 outputs a pulse signal in the state whereby the shutter blade 3 completely light-shields the photo sensing surface of the CCD 8 (at time $t_{13}$). The drive circuit 9 for the CCD 8 is reset in response to this signal and the pulses $\phi 2$ and $\phi 3$ shown in FIG. 5 are newly supplied, thereby allowing the photographing to be started.

Namely, the charges are newly stored in the photoelectric converting element in the interval from time $t_{13}$ to $t_{14}$ and the unnecessary charges which exist in the vertical shift register are read out in this interval similarly to the ordinary readout operation.

By again supplying the pulse $\phi1$ at time the time $t_{14}$, the charge storage in the photoelectric converting element is finished, so that the charges are transferred into the vertical shift register.

This interval from the time $t_{13}$ to $t_{14}$ may be preset by use of a dial or the like.

In this embodiment, after the pulse $\phi1$ was supplied at the time $t_{14}$, the supply of the pulses $\phi_1$ to $\phi_3$ is temporarily stopped. When an output pulse of the PG head 16 to detect the rotational phase of the recording medium 14 is obtained at time $t_{15}$, the pulses $\phi1$ to $\phi3$ are reset, thereby allowing the readout operation to be started. In addition, at the same time, the phase servo control for the medium 14 is started by the sequence control unit 18 on the basis of the output of the PG head 16 and pulse $\phi1$. Thus, the time signal is read out and the image signal of one field is recorded on the medium 14 by the head through the signal processors 10 and 11.

While the switch 20 is closed after the image signal of one field has been completely recorded, the recording is continued in accordance with the similar sequence as mentioned above.

In this way, according to this embodiment of the present invention, the image pickup device is synchronously driven in accordance with a predetermined phase of the shutter at least after the periodic driving speed of the shutter became stable, so that the time required for the phase control of the shutter system can be shortened.

Further, the image of one picture is photographed when the driving speed of the shutter system became stable before the phase of the recording system becomes stable; therefore, the operator will not miss the shutter chance.

Moreover, instead of performing the recording after the phase of the recording system becomes stable in this case, the readout is executed at the predetermined phase of the recording system after one picture has been completely photographed. Thus, the time necessary for phase control of the recording system can be also shortened.

Although the rotary shutter has been used in this embodiment, it is also possible to use a shutter which can be made operative instantly in response to the timing of the CCD 8 (for instance, a physical shutter, a shutter which is used in a film camera, etc.). A third embodiment of the present invention which employs such a shutter can be constituted as follows.

This third embodiment will then be explained in conjunction with FIG. 6.

When the switch 20 is closed at time $t_{16}$ and the power source is supplied to each part, the CCD 8 is driven by the drive circuit 9 synchronously with the reference clock. However, since the recording medium 14 doesn't reach a predetermined rotating speed, no recording is done.

When the rotating speed of the medium reaches a predetermined value at time $t_{17}$ and a high-level signal is output from the $F_2$ terminal, the shutter is driven in the interval when the photo sensor element 21 is storing the charges at time $t_{18}$ to $t_{19}$ synchronously with the shift pulse $\phi1$ which is supplied immediately after the above-mentioned high-level signal was output from the $F_2$ terminal. Thus, the photo sensor element 21 is exposed by the light for a predetermined time period. Thereafter, the drive circuit 9 is stopped in the state whereby the image signal was transferred to the vertical shift register 22 in response to the shift pulse $\phi1$ which is supplied subsequently to the exposure. (time $t_{19}$)

Next, in time $t_{20}$, the drive circuit 9 is again made operative in response to the pulse output of the PG head 16, so that the pulses $\phi2$ and $\phi3$ are supplied and the image signal is read out and is recorded.

While the switch 20 is closed, the abovementioned sequence is continuously executed.

Next, a fourth embodiment using no shutter will be explained with reference to FIG. 7.

Similar to the above-mentioned case, the power switch 20 is turned on at time $t_{22}$, so that the medium 14 reaches a predetermined rotating speed at time $t_{23}$ and a high-level signal is output from the $F_2$ terminal. When the next pulse $\phi1$ is supplied at time $t_{24}$, the drive circuit 9 is stopped. Next, when the signal is output from the PG head 16 at time $t_{25}$, the drive circuit 9 is again made operative and the pulses $\phi2$ and $\phi3$ are supplied, so that the image signal is read out and is recorded.

In this way, the image signal is stored in the vertical shift register 22 by stopping the drive circuit 9 after the pulse $\phi1$ was supplied. However, in a time other than the predetermined exposure seconds, in the case where the system has a shutter which light-shields the photo sensing surface of the CCD 8, the drive circuit can be also stopped in the state whereby the image signal was stored in the photosensing element 21, namely, in the state before the pulse $\phi1$ for allowing the image signal which should be recorded to be transferred to the vertical shift register is supplied.

On the other hand, an example of the rotary shutter has been described in the above as the shutter means which is periodically driven by use of the rotary shutter; however,the invention is not limited to such a type but is effective to all shutters having relatively slow response speeds.

In addition, although an example of the combination of the fixed head and rotary medium has been mentioned as the recording means in the foregoing embodiment, a combination of a rotary head and fixed medium may be used.

As described above, according to this embodiment of the present invention, there is no need to control the phase of the shutter with a slow leading time, so that the time necessary from the power-on to the photographing operation can be shortened; therefore, the operator will not miss the shutter chance.

What I claim is:

1. An image pickup apparatus comprising:
   image pickup means for converting an optical image into an electrical signal;
   recording means for recording the electrical signal; said recording means reaches a predetermined stable speed after being supplied with power;
   detecting means for producing a detection signal when said recording means reaches a predetermined stable speed after being supplied with power; and
   control means for resetting an operation of said image pickup means in response to said detection signal and for starting a phase control of said recording means.

2. An image pickup apparatus according to claim 1, wherein said control means forms a synchronous signal for driving said recording means in response to the detection signal.

3. An image pickup apparatus according to claim 1, wherein said control means resets a synchronous signal for driving said image pickup means in response to the detection signal.

4. An image pickup apparatus according to claim 1 wherein said image pickup means forms the electrical signal before said detecting means produces said detection signal.

* * * * *